Patented June 12, 1951

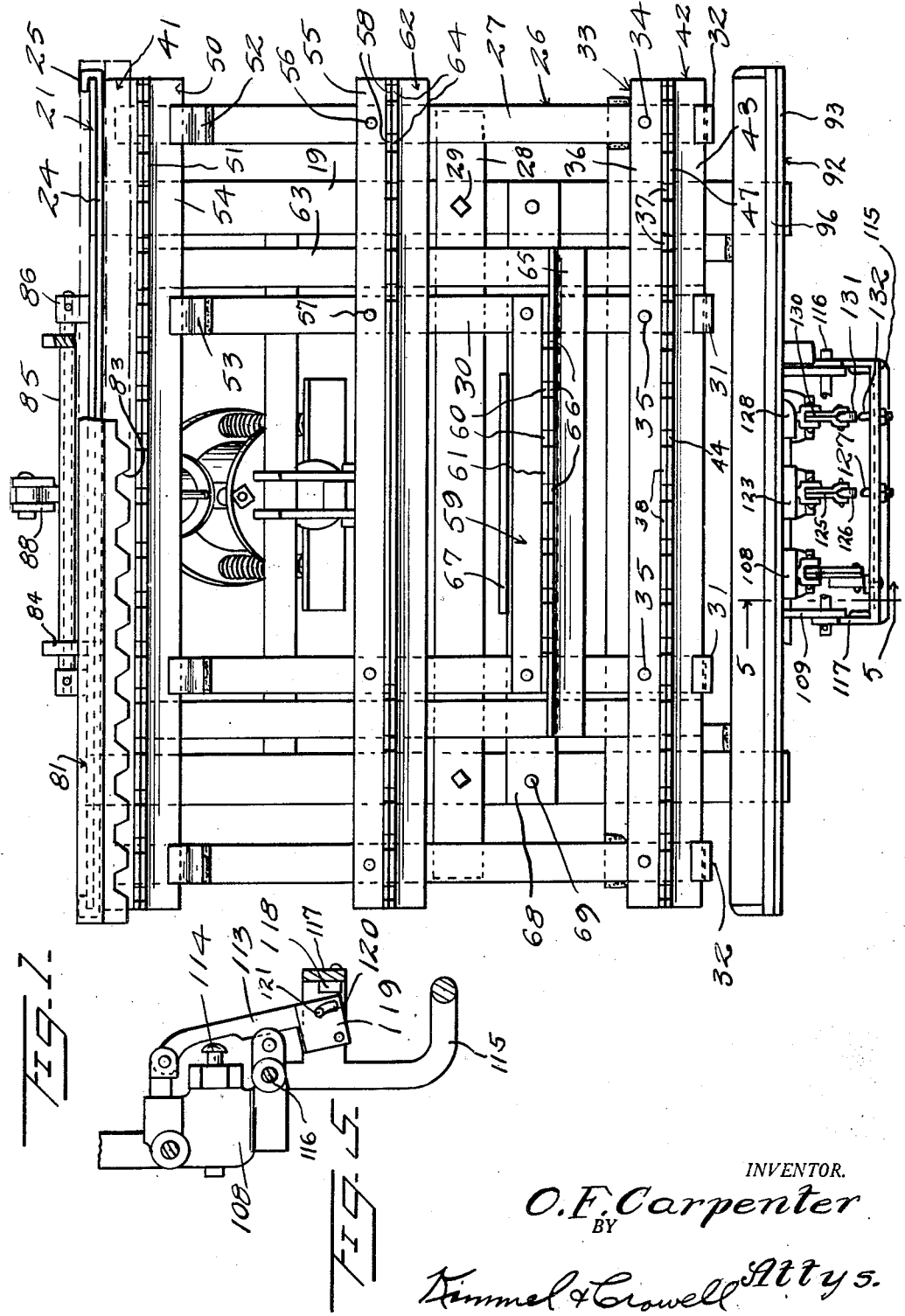

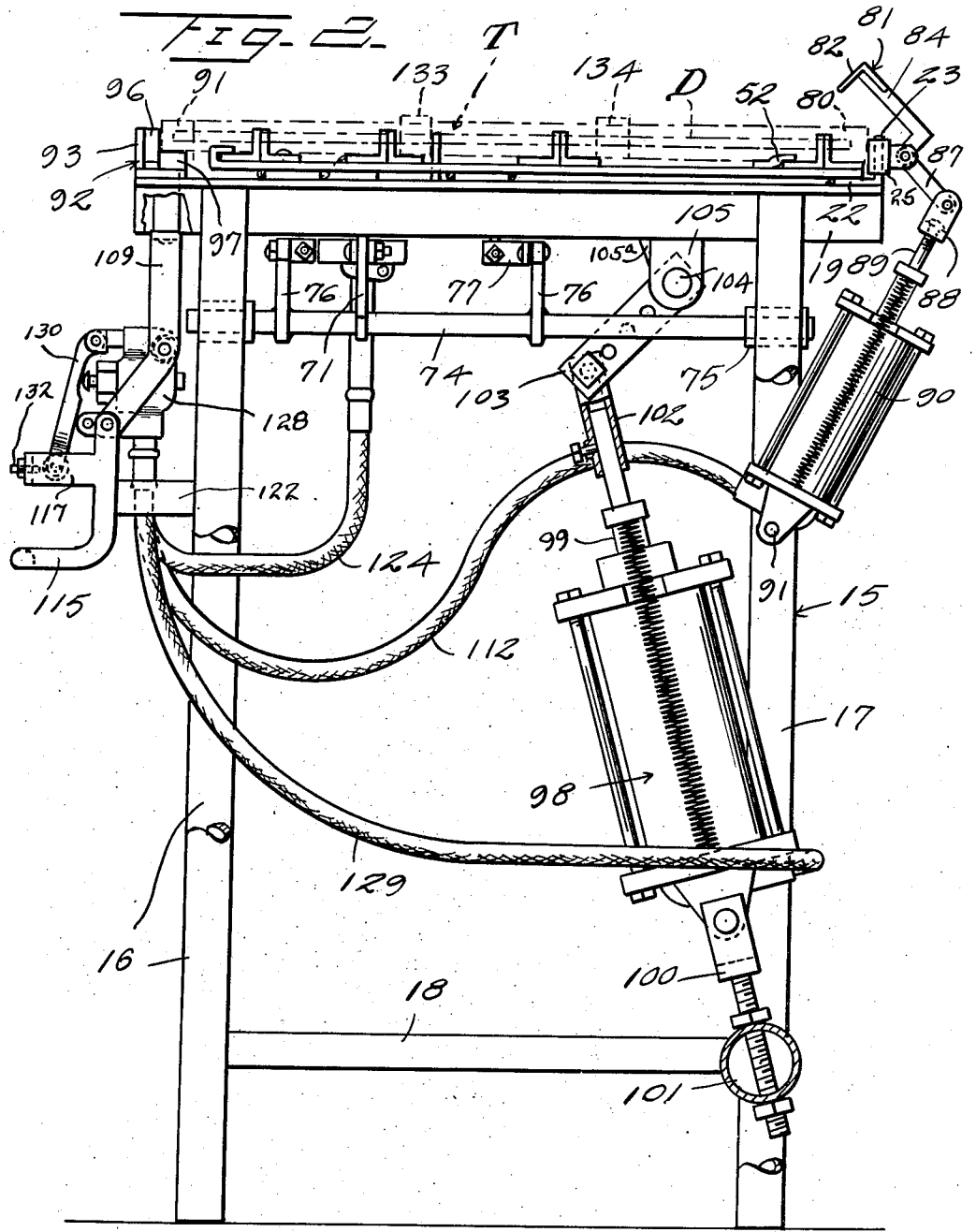

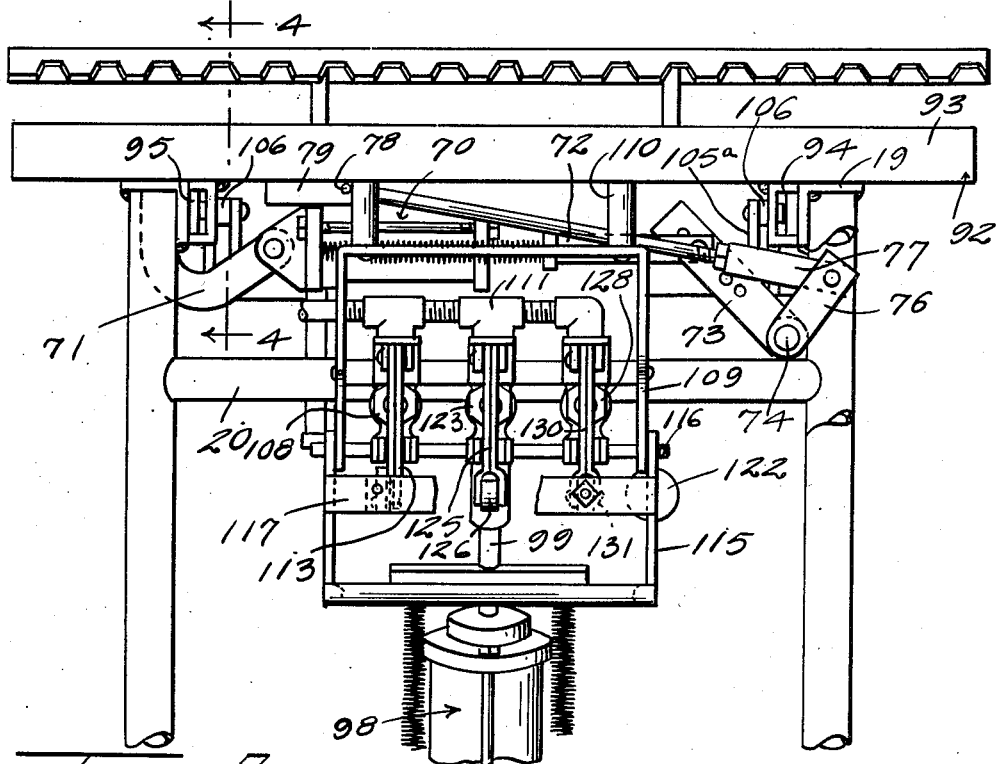

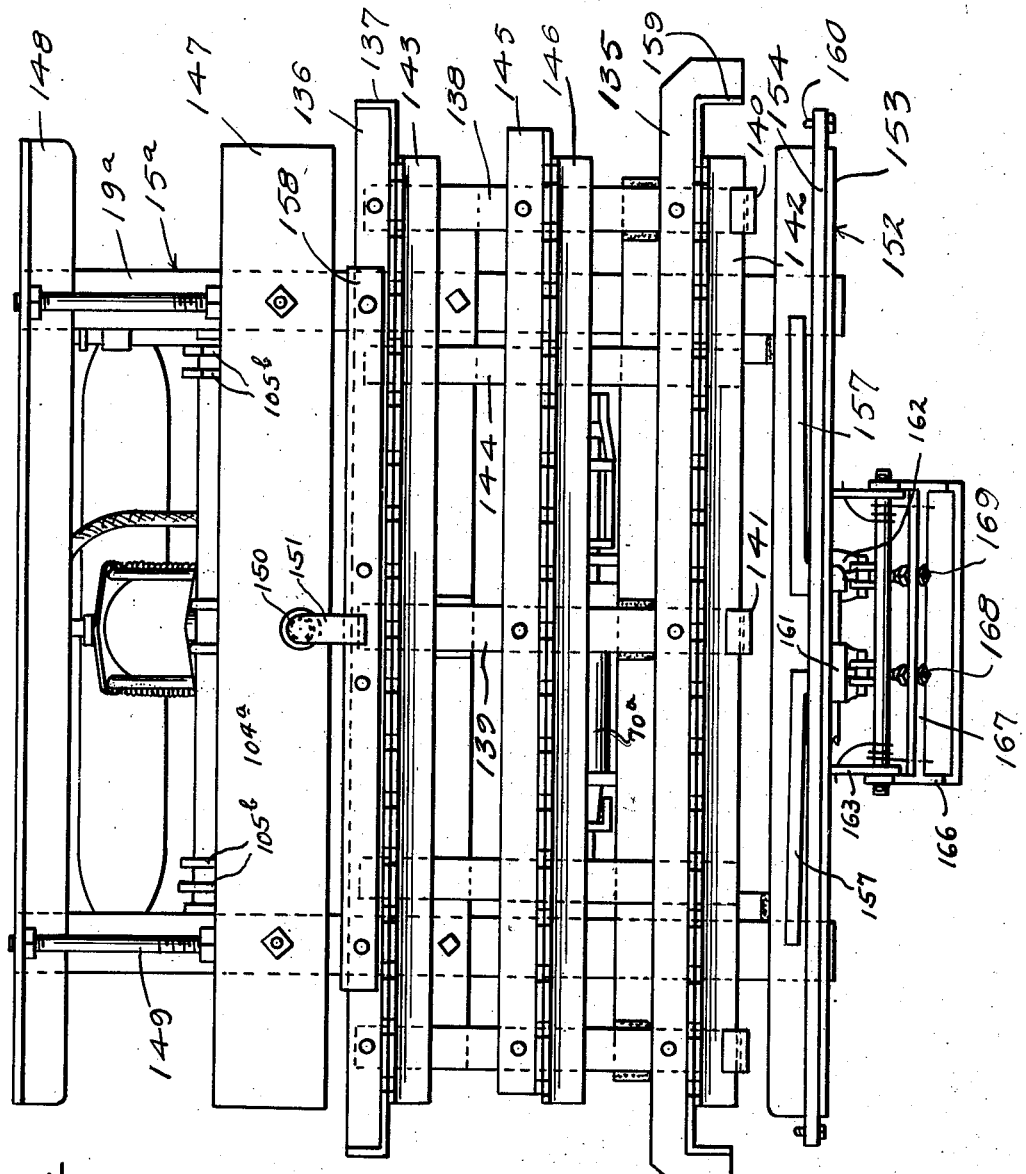

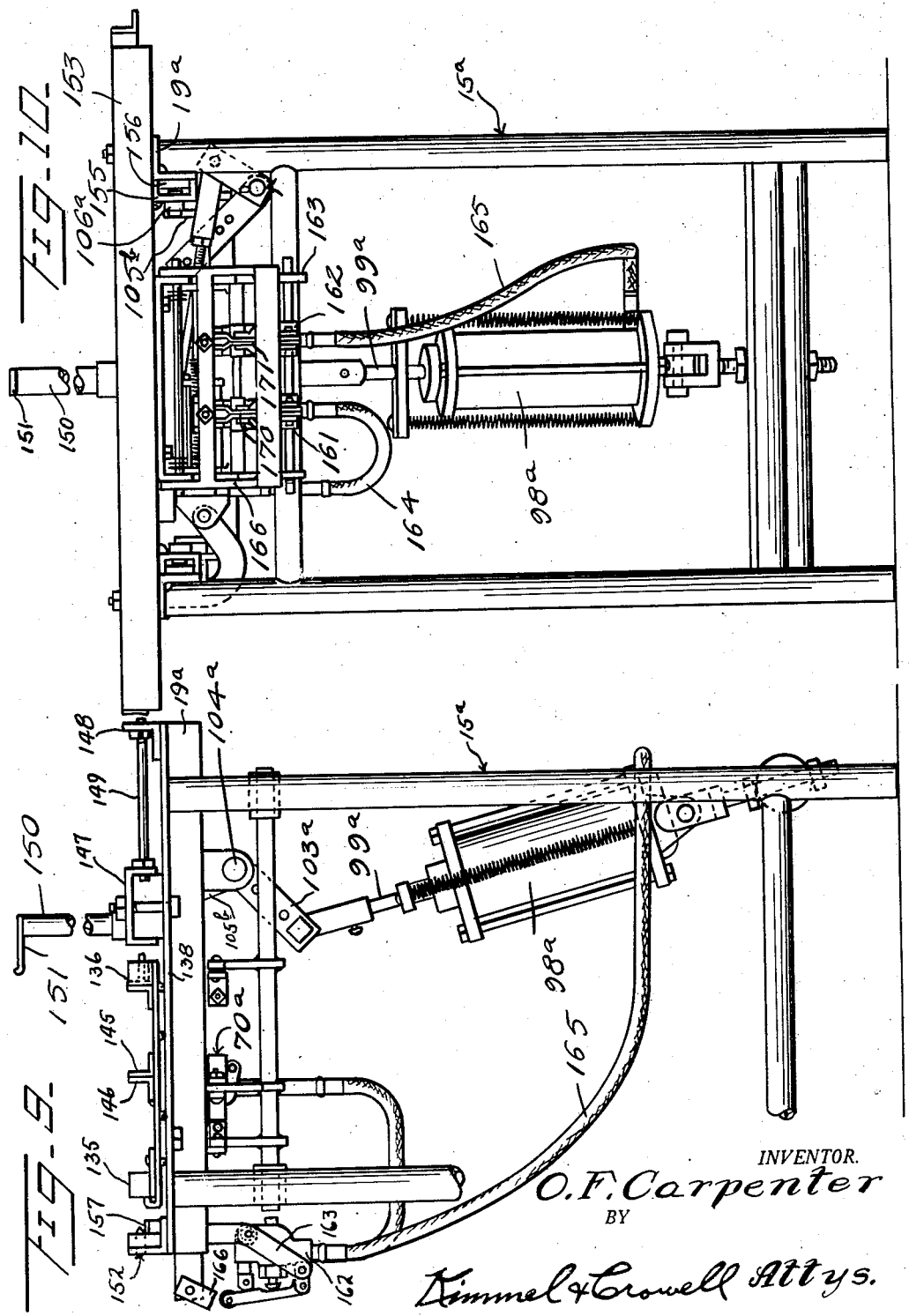

2,556,901

UNITED STATES PATENT OFFICE 2,556,901

COOP ASSEMBLING MACHINE

Ose F. Carpenter, Brightwood, Va.

Application October 19, 1948, Serial No. 55,378

6 Claims. (Cl. 144—2)

This invention relates to a machine for use in assembling shipping crates for fowl.

In the construction of shipping crates for fowl, the crates are formed of dowels extending through intermediate rails or bars and seated at their outer ends in sockets formed in outer bars or rails. In the process of assembly, the dowels are manually inserted into the holes of the intermediate bar or bars, and heretofore the outer bars were also manually mounted on the dowels. The manual placement of the outer bars on the dowels required extreme efficiency in order to maintain production schedules and was a limiting factor in the production schedule of a workman.

It is, therefore, an object of this invention to provide a machine which will speed up the assembly of the crate and permit such assembly by unskilled workmen.

Another object of this invention is to provide an assembly machine for crates of this kind embodying progressively operable parts and a single control means for setting such parts into timed operation.

A further object of this invention is to provide an assembly machine of this kind wherein the movable parts are fluid operated, the fluid being either air or liquid derived from a common supply source.

With the above and other objects in view, my invention consists in the arrangement, combination and details of construction disclosed in the drawings and specification, and then more particularly pointed out in the appended claims.

In the drawings,

Figure 1 is a plan view of a crate assembling machine constructed according to an embodiment of this invention, Figure 2 is a detail side elevation, partly broken away and in section, of the machine, Figure 3 is a fragmentary front elevation of the device, Figure 4 is a fragmentary sectional view taken on the line 4—4 of Figure 3, Figure 5 is a fragmentary sectional view taken on the line 5—5 of Figure 1, Figure 6 is a fragmentary exploded view showing the dowel clamping means, Figure 7 is a fragmentary sectional view showing the dowel positioning means at the rear of the machine, Figure 8 is a plan view of a modified form of this invention, Figure 9 is a detail side elevation, partly broken away, of the machine shown in Figure 8, Figure 10 is a detail front elevation of the machine shown in Figures 8 and 9.

Referring to the drawings and first to Figures 1 to 7 inclusive, the numeral 15 designates generally a frame structure embodying front and rear pairs of upright legs 16 and 17 respectively, which are connected together at their lower ends by connecting bars 18 and are connected together at their upper ends by angle bars 19. The end bars are connected together by one or more connecting bars 20, as shown in Figure 3, and at the rear the longitudinal angle bars 19 have fixed therebetween an angle bar 21 having one side 22 thereof horizontal and projecting forwardly and the other side 23 thereof vertical. A facing or filler bar 24 engages the forward side of the upright side 23 of the angle bar 21 and the filler bar 24 is formed at the opposite ends thereof with returned portions 25 engaging about the opposite ends of the upright side 23.

The frame structure 15 has mounted on the upper end thereof a stationary dowel clamping frame structure generally designated as 26 which includes longitudinal end bars 27 which have fixed between the ends thereof a transverse bar 28 which is fixed as at 29 to the upper sides of the longitudinal angle bars 19. A pair of inner longitudinal bars 30 are disposed inwardly from the bars 19 and are formed at their forward ends with hook-shaped guide members 31. The forward ends of the end bars 27 are also formed with hook-shaped guide means 32.

The longitudinal bars 27 and 30 have fixed thereto a forward dowel clamping bar 33 secured to the bars 27 and 30 by fastening means 34 and 35 respectively. The stationary dowel clamping bars 33 are formed of a horizontal lower side 36 and a vertical forward side 37. The vertical side 37 is formed with a cutout 38 having a straight vertical side 39 at one end thereof and a curve opposite end 40 as shown in Figure 6.

The stationary bars 27 and 30 also have fixed thereto a rear dowel clamping bar 41 which is similar to the forward clamping bar 33, being fixed to the bars 27 and 30 as by welding or other suitable fastening means. A laterally shiftable forward dowel clamping bar 42 is disposed with the horizontal side 43 thereof engaging the guide members 31 and 32, and with the vertical side 44 thereof confronting the vertical side 37 of the stationary bar 33.

The slide bar 42 is formed with notches or cutouts 47 similar to the cutouts 38, reversed with respect to the cutouts 38 so that the straight vertical end 48 will be disposed adjacent the curved end portion 46 of the cutout 38 and at the opposite end the cutout 47 is formed with a curved portion 49. When the slide bar 42 is shifted laterally or to the right which is the clamping position of the bar 42, the curved portion 49 will confront the curved portion 46 of the bar 33 and will clamp a dowel in the curved portions 46 and 49.

A rear slide bar or dowel clamping member 50 is disposed with the vertical side 51 thereof confronting the vertical side of the rear clamping member 41 and the two bars 41 and 51 are formed with notches or cutouts similar to the notches disclosed in Figure 6.

The stationary bars 27 and 30 are formed with upwardly offset guide means 52 and 53 respectively engaging over the horizontal side 54 of the rear clamping bar 50. An intermediate stationary clamping bar 55 is fixed as at 56 and 57 to the stationary bars 27 and 30 and is formed with an outer series 58 of notches similar to the notches 38.

A second intermediate clamping bar 59 is fixed between the inner stationary bars 30 and is formed with notches 60 in the vertical side 61 thereof similar to the notches 38. An intermediate laterally slidable clamping bar 62 is fixed to a pair of longitudinal connecting bars 63 disposed between the bar 19 and the inner stationary bar 30. The connecting bars 63 are also fixed as by welding or the like between the front and rear laterally movable clamping bars 42 and 50 respectively. The intermediate clamping bar 62 is formed with spaced notches 64 similar to the notches 47 and cooperates with the notches 58 in clamping dowels which extend between the front and rear clamping bars of the frame structure.

A second intermediate laterally movable clamping bar 65 is fixed between the bars 63, being formed with notches 66, similar to the notches 47 and cooperating with the notches 60 in clamping the intermediate short dowels forming part of the top wall of the crate.

An upright stationary bar or plate 67 is disposed adjacent the intermediate bar 28 and is carried by an elongated bar 68 which is fixed as at 69 to the side bars or rails 19. The upright member 67 is designed for use as an abutment to be engaged by an intermediate rail of the top crate so that the short dowels extending between the intermediate rail and the forward rail may be firmly pressed into the forward rail after being initially pre-set into the intermediate rail. It will be understood that the top wall of the crate is formed with an opening positioned between a pair of intermediate rails.

The laterally shiftable dowel clamping frame structure embodying the bars 42, 50, 62 and 65 is adapted to be shifted laterally or endwise under the action of a pressure operated member 70 which is supported from a supporting bar 71 fixed to the base frame 15. The pressure member 70 may be in the form of a hydraulic cylinder having a conventional piston therein or may be an air cylinder with a piston slidable therein. The piston of the power member 70 has extending therefrom a connecting rod 72 which is pivotally connected at its outer end to a lever arm 73 which is fixed to a rock shaft 74 carried by bearings 75 which are fixed to the front legs 16 and rear legs 17 of the frame 15. The shaft 74 has fixed thereto a pair of lever arms 76 extending upwardly and to which the rear end of an extensible pitman or link 77 is adapted to be connected. The link or pitman 77 is pivotally secured at the opposite end thereof to a pivot member 78 carried by a depending block 79 which is carried by the inner longitudinal bar 63.

When the doweled top wall T is placed in the frame structure the rear rail 80 is disposed on the upper side of the rear stationary clamping member 41. The rear edge of the rail 80 is adapted to abut against the bar 24 and in order to dispose the dowels D to the right ends of the notches in the bars 41 and 50 prior to the time that the slide bar 50 is shifted laterally or to the right, I have provided a positioning member generally designated as 81 which is constructed in the form of an angle member having one side 82 thereof formed with a plurality of spaced truncated V-shaped notches 83. The positioning bar 81 is rockably mounted on the rear of the frame and has fixed thereto a pair of L-shaped supporting arms 84 which are fixed to a horizontally disposed shaft 85 journalled in a pair of bearings 86 carried by the rear fixed angle member 21.

The shaft 85 has secured thereto a downwardly and rearwardly projecting arm 87 with which the upper end 88 of a plunger or piston rod 89 associated with an operating member 90 is adapted to be pivotally engaged. The operator 90 is constructed in the form of a cylinder with a slidable piston therein and may be either operated by liquid or air. The operator 90 is rockably secured to a supporting pin 91 which projects inwardly from one of the rear legs 17. When the side 82 of the angle member 81 is swung downwardly, the side 82 will be disposed on the forward side of the movable vertical side 51 of the clamping member 50.

In order to provide for forcibly inserting the dowels D into the rear rail 80 and also a front rail 91 forming part of the top T, I have provided a slidable pressure means generally designated as 92. The pressure means 92 includes an angle member 93 which is fixed to a pair of outwardly facing channel members 94 engaging between the longitudinal frame members 19. The frame members 19 have fixed to the inner sides thereof guide bars 95 which engage within the channels of the channel members 94, as shown in Figure 2.

The vertical side of the angle member 93 has fixed to the inner side thereof a reinforcing pressure bar 96 which is adapted to bear against the forward edge of the rail 91 of the top wall T. A bar 97 is adapted to be fixed to the horizontal side of the angle member 93 in a position whereby the lower side of the rail 91 may rest on the bar 97 so that the dowels D will be loosely disposed within the notches of the stationary and movable clamping bars. The pressure member 92 is adapted to be moved forwardly or rearwardly by means of an operator 98 constructed in the form of a conventional pressure cylinder with a piston slidable therein and a piston rod 99 projecting upwardly therefrom.

The operator 98 is secured to a vertically adjustable mounting 100 extending through a lower transverse connecting tubular bar 101 fixed between the rear legs 17. The connecting rod 99 engages in a sleeve 102 which is pivotally secured to a lever arm 103 carried by a transversely disposed shaft 104. The shaft 104 is rockably carried by depending bearings 105 which extend downwardly from the end frame members 19.

The shaft 104 has fixed thereto adjacent the opposite ends thereof a pair of upwardly projecting crank arms 105a between which a pitman 106 is pivotally mounted and the pitman 106 is pivotally secured to a pivot 107 carried by the channel member 94. There is a pitman 106 for each of the channel members 94, as shown in Figure 3.

A valve 108 is carried by a depending U-shaped frame 109 which is secured to the angle member 93 and as shown in Figure 3, a pair of spacers 110 are interposed between the bight of the frame 109 and the angle bar 93. The valve 108 is connected at its upper end to a manifold 111 which is adapted to be connected to a source of pressure supply which may be either air or liquid. The outlet side of the valve 108 is connected by means of a flexible tube 112 to the operator 90. The valve member 108 has pivotally secured thereto a valve operating lever 113 disposed in depending relation and adapted to engage the valve stem 114 so that rearward and downward rocking of the lever 113 will move the valve plug of the valve member 108 to open position.

The lever 113 is adapted to be rocked to valve opening position by means of a U-shaped lever 115 rockably mounted on a shaft 116 carried by the frame 109. The U-shaped member 115 has fixed thereto a forwardly projecting U-shaped member 117 and the bight of the U-shaped member 117 has fixed thereto a block 118 which is engageable with a pivoted block 119 carried by the lower end of the lever 113.

The pivoted block 119 is provided so that when the valve operating lever 115 is rocked downwardly and rearwardly the block 118 will only momentarily rock the lever 113 to valve opening position and will then ride past the pivoted block 119. The block 119 is formed with an elongated slot 120 within which a pin 121 carried by the lower end of the lever 113 loosely engages. When the operator 115 rotates about pivot 116 to swing forwardly of the frame and thus upwardly under the action of an elongated weight 122 carried thereby which serves to overbalance the weight of operator 115 relative to pivot 116, the block 118 will rock the lever block 119 upwardly, thereby permitting the block 118 to be disposed in its initial operating position in the forward side of block or latch member 119.

A second valve member 123 is fixed to the U-shaped frame 109, being connected at its intake side to the manifold 111 and connected on the outlet side thereof by means of a flexible tube 124 to the operator 70. The valve member 123 includes an operating lever 125 having a roller 126 on the lower end thereof which is adapted to be engaged by an adjustable bolt 127 carried by the bight of the U-shaped member 117. A third valve member 128 is fixed to the U-shaped member 109, being connected on the intake side thereof to the manifold 111 and connected by means of a flexible tube 129 to the operator 98. The valve structure 128 includes an operating lever 130 having a roller 131 at its lower end which is adapted to be engaged by an adjustable bolt 132 carried by the U-shaped member 117.

The operation of the valves 108, 123 and 128 is so timed that valve member 108 is the first valve to be moved to open position upon rocking of the lever 115, so that the dowel positioning member 81 will initially and momentarily swing forwardly and downwardly to position the dowels on the right ends of the notches 38 and 47. Further rocking of lever 115 will open valve 123 so that operator 70 will come into operation, moving the notched clamping bars 42, 50, 62 and 65 laterally and to the right to dowel clamping position. Further rearward rocking of lever 115 will cause valve 128 to open, communicating pressure operator 98 so that the presser member 92 will be moved rearwardly. At this time operator 70 will be maintained in communication with the pressure manifold 111 so that the dowels will be firmly locked between the stationary and slidable notched clamping bars. Rearward movement of the presser member 92 will push the forward rail 91 toward the forward ends of the dowels D and these dowels will be pushed through the intermediate rails 133 and 134.

The intermediate rail 133 will abut against the stationary bar 67 so that the short dowels will be pressed into the rail 91 and may also be pressed completely into the sockets formed for the short dowels in the intermediate rail 133. The longer dowels will be moved through the intermediate rails 133 and 134 and into the sockets of the rear rail 80.

In the use and operation of this machine, the crate top wall T is pre-assembled by disposing the dowels D through the intermediate rails 133 and 134. Certain ones of the dowels D between the ends of the rails 133 and 134 are short length dowels extending from the opening which is closed in the top wall by a conventional closure. When the dowels have been manually and initially mounted in the openings and sockets of the intermediate rails 133 and 134, the incompleted wall structure is mounted on top of the machine with rail 133 resting on stationary angle bar 59 in front of upright member 67. The dowels will be disposed in the notches of the stationary and movable clamping bars and at this time the rails 80 and 91 are disposed on the angle members 41 and 93, the operator 115 is then pushed rearwardly initially opening valve 108 so that positioning bar 81 will be rocked downwardly and forwardly to position the dowels in the right ends of the notches or cutouts 48 of movable clamping bars 42, and the movable notches of the other movable clamping bars.

The dowels upon lateral movement of the movable notched bars will be clamped in the arcuate end portions 40 and 49 of the movable and stationary clamping bars and at this time additional rearward movement of operator 115 will open valve 128 so as to communicate operator 98 with the source of pressure supply. Operator 98 will then move presser member 92 rearwardly to press the rails 91 and 80 onto the opposite ends of the dowels.

Referring now to Figures 8, 9 and 10 there is disclosed a modified form of crate assembling machine embodying a stationary frame 15a which is similar to the frame 15. The frame 15a which includes upper longitudinal frame bars 19a has fixed thereto front and rear notched angle bars 135 and 136 respectively. The opposite ends of the rear angle bar 136 are formed with rearwardly extending end members 137 between which the longitudinal rails 80 or 91 of the top T shown in Figure 2 are adapted to be positioned. The front and rear members 135 and 136 are connected together by outer connecting bars 138 and an intermediate connecting bar 139.

The outer connecting bars 138 are formed at their forward ends with U-shaped guide members 140 and the intermediate connecting member 139 is formed at its forward end with a U-shaped guide member 141. Front and rear laterally slidable angle members 142 and 143 are disposed with their vertical sides in confronting position to the vertical sides of the stationary angle members 135 and 136 respectively. The slidable angle members 142 and 143 are connected together by connecting bars 144 which are disposed inwardly from the frame bars 19a. An intermediate stationary angle bar 145 is fixed to the longitudinal connecting bars 138 and 139 and an intermediate slidable angle member 146 is disposed in confronting position to the angle member 145 and is fixed to the connecting bars 144.

The angle members 135, 136, 142, 143, 145 and 146 are notched in their vertical sides in the same manner as the angle members 33 and 34, as shown in Figure 6. An inverted stationary channel bar 147 is secured to a rear fixed angle bar 148, being disposed forwardly of the rear angle bar 148 and secured thereto by means of a pair of bolts 149. The channel member 147 has rising upwardly from the middle position thereof an upright tubular bar 150 formed with a forwardly projecting arm 151. The arm 151 is adapted to engage over the upper one of either of the longitudinal rails of the top T so that the assembled top T will be held in upright position in order that the sides or ends of the crate may be formed with the top.

A longitudinally movable slide member generally designated as 152 is carried by the frame 15a at the top thereof and includes a front angle member 153 having fixed thereto a bar 154. The angle member 153 is fixed to a pair of U-shaped slide members 155 which slidably engage guide bars 156 carried by the inner sides of the angle members 19a. The angle member 153 has fixed to the rear side thereof a pair of oppositely extending elongated flat springs 157 which form adjustable supports for the front rail of either the side or end of the crate which is engaged with the angle member 153.

The rear stationary angle member 136 has fixed thereto a spacer bar 158 engaging the upper side of the angle member 136 so that the lower rail of the crate top wall will be disposed in a position whereby the dowels of either the side or end will properly align with the sockets formed in the rail positioned on the bar 158. The forward stationary angle member 135 is formed with a forwardly projecting end member 159 designed to hold the forward bar or rail against endwise movement. The opposite ends of the bar 154 are provided with a pair of rearwardly projecting positioning pins 160 which are engageable in corresponding dowel sockets of elongated rails or bars which rest on the springs 157. The provision of the springs 157 is such that the rail engaging thereon may be pressed downwardly by the operator of the machine so that the sockets in such rail will align with the dowels in the notched clamping frame bars and so that the rail engaged with the springs 157 may be pressed onto the forward ends of the dowels.

A pair of valve members 161 and 162 are secured to a U-shaped frame 163 which is fixed to the angle member 153 and valve member 161 is connected by means of a tubular connecting member 164 to an operator 70a similar in every detail to operator 70. The operator 70a is adapted to shift the slidable clamping bars laterally to clamp the dowels in the notches of the slidable clamping bars and the stationary clamping bars.

Valve 162 is connected by means of a tube 165 to an operator 98a similar to operator 98 and connected through connecting rod 99a to a lever arm 103a carried by shaft 104a. Shaft 104a has secured thereto pairs of upwardly and forwardly projecting lever arms 105b which are connected to the slidable channel members 155 by means of pitmans 106a. The valve members 161 and 162 are progressively moved to open position by means of a depending valve operating lever 166 which has a transverse bar 167 through which adjustable bolts 168 and 169 are mounted.

The bolt 168 is adapted to engage the lever 170 of valve 161 and bolt 169 is adapted to engage the lever 171 of valve 162. When the operator 166 is rocked downwardly and rearwardly valve member 161 is initially moved to open position and held in such open position during the time that valve member 162 is moved to open position.

The operation of the device disclosed in Figures 9, 10, and 11 is substantially identical to that of the previously discussed modification in that the valve operator 166 serves, first, by virtue of the successive engagement of levers 170 and 171 by their associated bolts to energize fluid actuated operator 70a to clamp the dowels in the notches of the slidable clamping bars and the stationary clamping bars, and then to actuate operator 98a to insert the dowels in the frame.

With a machine as hereinbefore described, the positioning of the outer rails on the ends of the dowels is accomplished in a single operation and can be accomplished more quickly than has been heretofore done by a manual assembly.

I do not mean to confine myself to the exact details of construction herein disclosed but claim all variations falling within the purview of the appended claims.

What I claim is:

1. A crate assembling machine for securing in one operation a plurality of parallel dowels in sockets formed in rails, said machine comprising a frame, notched dowel supporting means carried by said frame, notched dowel clamping means carried by said frame for clamping the dowels in the notches of said dowel supporting means, a dowel positioning bar rockably carried by said frame and formed with notches for disposing the dowels at one end of the notches of said dowel supporting means, an operator for said positioning bar, a second operator for said dowel clamping means, a fixed rail supporting member, a slidable rail supporting member, a third operator for said slidable rail supporting member, and regulating means connected to said operators so constructed and arranged that each of said operators will be rendered effective in sequence.

2. A coop assembling machine for securing in one operation a plurality of parallel dowels in sockets formed in rails, said machine comprising a frame, notched dowel supporting means carried by said frame, notched dowel clamping means carried by said frame for clamping the dowels in the notches of said dowel supporting means, a dowel positioning bar rockably carried by said frame and formed with V-shaped notches for disposing the dowels at one end of the notches of said dowel supporting means, an operator for said positioning bar, a second operator for said dowel clamping means, a fixed rail supporting member, a slidable rail supporting member, a third operator for said slidable rail supporting member, and regulating means connected to said operators so constructed and arranged that each of said operators will be rendered effective in sequence, said regulating means comprising a U-shaped switch, a plurality of projecting members on the inner surface thereof of different lengths, and a plurality of valves adjacent said members, one of said valves being operatively connected with each of said operators.

3. A coop assembling machine for securing in one operation a plurality of parallel dowels in sockets formed in rails, said machine comprising a frame, notched dowel supporting means carried by said frame, notched dowel clamping means carried by said frame for clamping the dowels in the notches of said dowel supporting means, a dowel positioning bar rockably carried by said frame and formed with notches for disposing the dowels at one end of the notches of said dowel supporting means, a hydraulic operator for said positioning bar, a second hydraulic operator for said dowel clamping means, a fixed rail supporting member, a slidable rail supporting member, a third hydraulic operator for said slidable rail supporting member, and regulating means including a valve for each operator connected to said operators so constructed and arranged that each of said operators will be rendered effective in sequence.

4. A coop assembling machine for securing in one operation a plurality of parallel dowels in sockets formed in rails, said machine comprising a frame, notched dowel supporting means carried by said frame, notched dowel clamping means carried by said frame for clamping the dowels in the notches of said dowel supporting means, a dowel positioning bar rockably carried by said frame and formed with notches for disposing the dowels at one end of the notches of said dowel supporting means, a hydraulic operator for said positioning bar, a second hydraulic operator for said dowel clamping means, a fixed rail supporting member, a slidable rail supporting member, a third hydraulic operator for said slidable rail supporting member, and regulating means including a valve for each operator connected to said operators so constructed and arranged that each of said operators will be rendered effective in sequence, said regulating means comprising an operating lever having a plurality of contact members thereon positioned adjacent said valves whereby said valves are progressively engaged by said contact members.

5. A coop assembling machine for securing in one operation a plurality of parallel dowels in sockets formed in rails, said machine comprising a frame, notched dowel supporting means carried by said frame, notched dowel clamping means carried by said frame for clamping the dowels in the notches of said dowel supporting means, a hydraulic operator for said dowel clamping means, a fixed rail supporting member, a slidable rail supporting member, a second hydraulic operator for said slidable rail supporting means and regulating means connected to said operators so constructed and arranged that each of said operators will be rendered effective sequentially.

6. A coop assembling machine for securing in one operation a plurality of parallel dowels in sockets formed in rails, said machine comprising a frame, notched dowel supporting means carried by said frame, notched dowel clamping means carried by said frame for clamping the dowels in the notches of said dowel supporting means, a dowel positioning bar rockably carried by said frame and formed with V-shaped notches for disposing the dowels at one end of the notches of said dowel supporting means, an operator for said positioning bar, a second operator for said dowel clamping means, a fixed rail supporting member, a slidable rail supporting member, a third operator for said slidable rail supporting member, and regulating means connected to said operators so constructed and arranged that each of said operators will be rendered effective in sequence, and means for retaining said first and second operators in actuated position during the actuation of said third operator.

OSE F. CARPENTER.

REFERENCES CITED

The following references are of record in the file of this patent:

UNITED STATES PATENTS

| Number | Name | Date |
| --- | --- | --- |
| 1,204,813 | Murray | Nov. 14, 1916 |
| 1,209,705 | Hayward | Dec. 26, 1916 |
| 1,291,430 | Davenport | Jan. 14, 1919 |
| 1,645,414 | Kalgren | Oct. 11, 1927 |
| 1,695,461 | Kalgren | Dec. 18, 1928 |
| 1,732,217 | Breest et al. | Oct. 22, 1929 |